(12) United States Patent
Hirakawa et al.

(10) Patent No.: US 11,118,056 B2
(45) Date of Patent: Sep. 14, 2021

(54) THERMALLY CONDUCTIVE POLYSILOXANE COMPOSITION

(71) Applicant: MOMENTIVE PERFORMANCE MATERIALS JAPAN LLC, Tokyo (JP)

(72) Inventors: Daigo Hirakawa, Tokyo (JP); Masanori Takanashi, Tokyo (JP); Isao Iida, Tokyo (JP); Kenji Takenaka, Tokyo (JP); Eiji Tanigawa, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 369 days.

(21) Appl. No.: 16/319,639

(22) PCT Filed: Jul. 20, 2017

(86) PCT No.: PCT/JP2017/026219
§ 371 (c)(1),
(2) Date: Jan. 22, 2019

(87) PCT Pub. No.: WO2018/016566
PCT Pub. Date: Jan. 25, 2018

(65) Prior Publication Data
US 2021/0147681 A1 May 20, 2021

(30) Foreign Application Priority Data

Jul. 22, 2016 (JP) .................................. 2016-144436
Jul. 22, 2016 (JP) ............................. JP2016-144437

(51) Int. Cl.
| | |
|---|---|
| *C08L 83/04* | (2006.01) |
| *C08G 77/08* | (2006.01) |
| *C08G 77/12* | (2006.01) |
| *C08G 77/18* | (2006.01) |
| *C08G 77/20* | (2006.01) |
| *C08G 77/00* | (2006.01) |
| *C08K 3/22* | (2006.01) |
| *C08K 3/28* | (2006.01) |

(52) U.S. Cl.
CPC .............. *C08L 83/04* (2013.01); *C08G 77/08* (2013.01); *C08G 77/12* (2013.01); *C08G 77/18* (2013.01); *C08G 77/20* (2013.01); *C08G 77/70* (2013.01); *C08K 3/22* (2013.01); *C08K 3/28* (2013.01); *C08K 2003/2227* (2013.01); *C08K 2003/282* (2013.01); *C08K 2201/003* (2013.01); *C08L 2203/206* (2013.01); *C08L 2205/03* (2013.01)

(58) Field of Classification Search
CPC ........ C08G 77/18; C08G 77/12; C08G 77/20; C08L 83/04; C08K 2201/001
See application file for complete search history.

(56) References Cited

U.S. PATENT DOCUMENTS

| | | | |
|---|---|---|---|
| 5,021,494 | A | 6/1991 | Toya |
| 6,114,429 | A | 9/2000 | Yamada et al. |
| 6,169,142 | B1 | 1/2001 | Nakano et al. |
| 6,306,957 | B1 | 10/2001 | Nakano et al. |
| 7,141,273 | B2 | 11/2006 | Endo et al. |
| 7,279,224 | B2 | 10/2007 | Aoki et al. |
| 7,692,032 | B2 | 4/2010 | Hoshino |
| 8,802,763 | B2 | 8/2014 | Yamada et al. |
| 10,683,444 | B2 | 6/2020 | Takanashi et al. |
| 10,808,154 | B2 | 10/2020 | Gubbles et al. |
| 2002/0022127 | A1 | 2/2002 | Katsuda et al. |
| 2003/0229174 | A1 | 12/2003 | Goto et al. |
| 2005/0049357 | A1 | 3/2005 | Zhong et al. |
| 2007/0185259 | A1 | 8/2007 | Hoshino |
| 2010/0048435 | A1 | 2/2010 | Yamagata et al. |
| 2010/0140538 | A1 | 6/2010 | Sekiba |
| 2011/0009544 | A1 | 1/2011 | Funahashi |
| 2016/0152794 | A1 | 6/2016 | Diaham et al. |
| 2017/0081578 | A1 | 3/2017 | Kato et al. |
| 2018/0134938 | A1 | 5/2018 | Hirakawa et al. |
| 2019/0161666 | A1 | 5/2019 | Tanigawa et al. |
| 2020/0123327 | A1 | 4/2020 | Sakurai et al. |
| 2020/0140736 | A1 | 5/2020 | Takenaka et al. |

FOREIGN PATENT DOCUMENTS

| | | |
|---|---|---|
| CN | 1860181 A | 11/2006 |
| CN | 101641412 A | 2/2010 |
| EP | 3299420 A1 | 3/2018 |
| EP | 3575365 * | 12/2019 |

(Continued)

OTHER PUBLICATIONS

Chinese Office Action (and partial English language translation thereof) dated Jan. 20, 2021 issued in Chinese Application No. 201780038857.4.
Extended European Search Report (EESR) dated Feb. 10, 2021 issued in European Application No. 18808875.1.
Extended European Search Report (EESR) dated Mar. 6, 2020 issued in European Application No. 17831081.9.
International Search Report (ISR) dated Jan. 31, 2017 issued in International Application No. PCT/JP2016/082627.
International Search Report (ISR) dated Jul. 3, 2018 (and English translation thereof), issued in International Application No. PCT/JP2018/020905.

(Continued)

*Primary Examiner* — Kuo Liang Peng
(74) *Attorney, Agent, or Firm* — Holtz, Holtz & Volek PC

(57) ABSTRACT

A thermally conductive polysiloxane composition includes (A) a thermally conductive filler, and (B) at least one member selected from the group consisting of an alkoxysilyl group-containing compound and a dimethylpolysiloxane. The component (A) includes at least two thermally conductive fillers having different average particle diameters, and (A-1) indefinite-shaped aluminum nitride particles having an average particle diameter of 30 μm to 150 μm in an amount of at least 20% by mass, based on the mass of a total of the component (A).

20 Claims, No Drawings

(56) References Cited

FOREIGN PATENT DOCUMENTS

| | | |
|---|---|---|
| EP | 3575365 A1 | 12/2019 |
| JP | S62225533 A | 10/1987 |
| JP | 02097559 A | 4/1990 |
| JP | H06209057 A | 7/1994 |
| JP | 08208993 A | 8/1996 |
| JP | H11199672 A | 7/1999 |
| JP | 2000001616 A | 1/2000 |
| JP | 2000095896 A | 4/2000 |
| JP | 2000256558 A | 9/2000 |
| JP | 2001158609 A | 6/2001 |
| JP | 2001158610 A | 6/2001 |
| JP | 2001189407 A | 7/2001 |
| JP | 2002003831 A | 1/2002 |
| JP | 2002047009 A | 2/2002 |
| JP | 2002299533 A | 10/2002 |
| JP | 2003213133 A | 7/2003 |
| JP | 2004010880 A | 1/2004 |
| JP | 2005023246 A | 1/2005 |
| JP | 2005162975 A | 6/2005 |
| JP | 2006143978 A | 6/2006 |
| JP | 2007119588 A | 5/2007 |
| JP | 2008150439 A | 7/2008 |
| JP | 2008156578 A | 7/2008 |
| JP | 2008266449 A | 11/2008 |
| JP | 2008280395 A | 11/2008 |
| JP | 2009096961 A | 5/2009 |
| JP | 2009203373 A | 9/2009 |
| JP | 2010006923 A | 1/2010 |
| JP | 2010150321 A | 7/2010 |
| JP | 2013147600 A | 8/2013 |
| JP | 2013234237 A | 11/2013 |
| JP | 2014234506 A | 12/2014 |
| JP | 2015013927 A | 1/2015 |
| JP | 2015071662 A | 4/2015 |
| WO | 2005030874 A1 | 4/2005 |
| WO | 2008047809 A1 | 4/2008 |
| WO | 2009136508 A1 | 11/2009 |
| WO | 2015004115 A1 | 1/2015 |
| WO | 2016190188 A1 | 12/2016 |
| WO | 2016190189 A1 | 12/2016 |
| WO | 2017115679 A1 | 7/2017 |

OTHER PUBLICATIONS

International Search Report (ISR) dated Sep. 12, 2017 issued in International Application No. PCT/JP2017/026218.
Japanese Office Action (and English language translation thereof) dated Feb. 24, 2021 issued in Japanese Application No. 2018-100426.
Office Action (Final Rejection) dated Dec. 20, 2019 issued in related U.S. Appl. No. 15/772,690.
Office Action (Final Rejection) dated Jul. 15, 2020 issued in related U.S. Appl. No. 15/772,690.
Office Action (Non-Final Rejection) dated Feb. 26, 2021 issued in related U.S. Appl. No. 16/618,083.
Office Action (Non-Final Rejection) dated Mar. 1, 2021 issued in related U.S. Appl. No. 16/319,624.
Office Action (Non-Final Rejection) dated May 1, 2020 issued in related U.S. Appl. No. 15/772,690.
Office Action (Non-Final Rejection) dated Sep. 12, 2019 issued in related U.S. Appl. No. 15/772,690.
Related U.S. Appl. No. 15/772,690; First Named Inventor: Eiji Tanigawa; Title: "Method for Producing a Thermally Conductive Polysiloxane Composition"; Filed: May 1, 2018.
Related U.S. Appl. No. 16/319,624; First Named Inventor: Eiji Tanigawa; Title: "Surface Treatment Agent for Thermally Conductive Polyorganosiloxane Composition"; Filed: Jan. 22, 2019.
Related U.S. Appl. No. 16/618,083, First Named Inventor: Kenji Takenaka; Title: "Thermally Conductive Polysiloxane Composition"; Filed: Nov. 27, 2019.
Written Opinion dated Jan. 31, 2017 issued in International Application No. PCT/JP2016/082627.
Written Opinion dated Sep. 12, 2017 issued in International Application No. PCT/JP2017/026218.
Written Opinion of the International Searching Authority dated Jul. 3, 2018 issued in International Application No. PCT/JP2018/020905.
International Search Report (ISR) dated Oct. 10, 2017 issued in International Application No. PCT/JP2017/026219.
Written Opinion dated Oct. 10, 2017 issued in International Application No. PCT/JP2017/026219.
Korean Office Action (and English language translation thereof) dated May 12, 2021 issued in Korean Application No. 10-2019-7005321.
Office Action (Non-Final Rejection) dated Jun. 1, 2021 issued in related U.S. Appl. No. 15/772,690.
Chinese Office Action (and English language translation thereof) dated Jun. 8, 2021, issued in Chinese Application No. 201880036368.X.
Edited by Wang, "Green Chemical Additives", Jan. 2006.
Edited by Wang, "Production and Application of Epoxy Resins", Jun. 2001.
Zhou, et al., "Thermally Conductive Polymer Materials", Apr. 2014.

* cited by examiner

THERMALLY CONDUCTIVE POLYSILOXANE COMPOSITION

TECHNICAL FIELD

The present invention relates to a thermally conductive polysiloxane composition.

BACKGROUND ART

Electronic devices year after year become higher in the integration and speed, and, according to this, the demand for heat dissipation materials for solving heat problems is increasing. In heat dissipation materials, silicone resin compositions are widely used. A silicone resin cannot enhance the thermal conductivity by itself, and therefore a thermally conductive filler and the silicone resin are used in combination. It has been known that, as a thermally conductive filler, a material having a higher thermal conductivity than that of a silicone resin as a binder, such as a silica powder, alumina, boron nitride, aluminum nitride or magnesium oxide, is added (Patent Literature 1).

For increasing the thermal conductivity of the silicone resin composition, it is necessary to fill the composition with a thermally conductive filler at a higher filling ratio, but increasing the filling ratio using only a single type of a thermally conductive filler has a limitation, and therefore the use of a plurality of thermally conductive fillers having different particle diameters in combination has been attempted. For example, for the purpose of achieving good fluidity for working properties and excellent heat dissipation performance, a thermally conductive silicone grease composition containing a thermally conductive filler having an average particle diameter of 12 to 100 μm (preferably 15 to 30 μm) and a thermally conductive filler having an average particle diameter of 0.1 to 10 μm (preferably 0.3 to 5 μm) has been disclosed (Patent Literature 2). Further, a thermally conductive silicone composition of an addition reaction type made by blending in a specific ratio an indefinite-shaped alumina having an average particle diameter of 10 to 30 μm, a spherical-shaped alumina having an average particle diameter of 30 to 85 μm, and an insulating inorganic filler having an average particle diameter of 0.1 to 6 μm has been disclosed (Patent Literature 3).

CITATION LIST

Patent Literature

Patent Literature 1: Japanese Patent Application Kokai Publication No. 2002-003831
Patent Literature 2: Japanese Patent Application Kokai Publication No. 2009-096961
Patent Literature 3: Japanese Patent Application Kokai Publication No. 2013-147600

SUMMARY OF INVENTION

Technical Problem

However, with respect to the silicone compositions of Patent Literatures 2 and 3, when the composition is filled with the thermally conductive fillers at a high filling ratio, the viscosity of the composition is increased, so that working properties become poor. When filling the silicone compositions of Patent Literatures 2 and 3 with the thermally conductive fillers, respectively, at such a high filling ratio that the working properties do not become poor, the resultant compositions have still an unsatisfactory thermal conductivity.

The present inventors have paid attention to aluminum nitride having a relatively high thermal conductivity as a thermally conductive filler, and have made extensive and intensive studies with a view toward filling a composition with spherical-shaped aluminum nitride particles at a high filling ratio. As a result, we have found that a composition having a higher thermal conductivity can be obtained by using the aluminum nitride. However, this composition has a problem in that when the composition is filled with the thermally conductive filler at a higher filling ratio, the viscosity of the composition is increased, so that both a high thermal conductivity and excellent working properties cannot be achieved.

Accordingly, the problem to be solved by the present invention is to provide a thermally conductive polysiloxane composition having a high thermal conductivity and having excellent working properties due to a low viscosity of the composition, and a heat dissipation material using the same.

Solution to Problem

The present inventors have paid attention to aluminum nitride as a thermally conductive material, and have made various studies on the shape of the particles, the particle diameter and the proportion of the particles blended. As a result, the present invention has been completed.

The subject matter of the present invention is as follows.

(1) A thermally conductive polysiloxane composition containing (A) a thermally conductive filler, and (B) at least one member selected from the group consisting of an alkoxysilyl group-containing compound and a dimethylpolysiloxane, wherein the component (A) comprises two or more thermally conductive fillers having different average particle diameters, and contains (A-1) indefinite-shaped aluminum nitride particles having an average particle diameter of 30 to 150 μm in an amount of 20% by mass or more, based on the mass of a total of the component (A).

(2) The thermally conductive polysiloxane composition according to item (1) above, wherein the component (A-1) has an oxygen content of less than 0.20% by mass.

(3) The thermally conductive polysiloxane composition according to item (1) or (2) above, wherein the aluminum nitride particles of the component (A-1) are single crystal particles.

(4) The thermally conductive polysiloxane composition according to anyone of items (1) to (3) above, wherein the component (A) comprises 20 to 70% by mass of the component (A-1), 1 to 50% by mass of (A-2) inorganic particles having an average particle diameter of 1 to less than 30 μm, and 1 to 50% by mass of (A-3) inorganic particles having an average particle diameter of 0.1 to less than 1 μm.

(5) The thermally conductive polysiloxane composition according to item (4) above, wherein the inorganic particles of the component (A-2) are aluminum nitride particles or alumina particles.

(6) The thermally conductive polysiloxane composition according to anyone of items (1) to (5) above, which further contains (C) a polyorganosiloxane containing one or more aliphatic unsaturated groups per molecule.

(7) The thermally conductive polysiloxane composition according to anyone of items (1) to (6) above, which further contains (D) a polyorganohydrogensiloxane having two or more hydrogen atoms bonded to silicon atoms per molecule, and (E) a platinum-based catalyst.

(8) The thermally conductive polysiloxane composition according to any one of items (1) to (7) above, wherein the component (B) comprises the alkoxysilyl group-containing compound, wherein the composition further contains (F) a condensation catalyst.

(9) A heat dissipation material comprising the thermally conductive polysiloxane composition according to any one of items (1) to (8) above.

Advantageous Effects of Invention

In the present invention, there can be provided a thermally conductive polysiloxane composition having a high thermal conductivity and having excellent working properties due to a low viscosity of the composition, and a heat dissipation material using the same.

DESCRIPTION OF EMBODIMENTS

The present invention is a thermally conductive polysiloxane composition which contains (A) a thermally conductive filler, and (B) at least one member selected from the group consisting of an alkoxysilyl group-containing compound and a dimethylpolysiloxane, wherein the component (A) comprises two or more thermally conductive fillers having different average particle diameters, and contains (A-1) indefinite-shaped aluminum nitride particles having an average particle diameter of 30 to 150 μm in an amount of 20% by mass or more, based on the mass of a total of the component (A).

[Component (A)]

A component (A) is a thermally conductive filler, and comprises two or more thermally conductive fillers having different average particle diameters, and contains (A-1) indefinite-shaped aluminum nitride particles having an average particle diameter of 30 to 150 μm in an amount of 20% by mass or more, based on the mass of a total of the component (A). The component (A) comprises two or more thermally conductive fillers having different average particle diameters, which include the component (A-1), and therefore the polysiloxane composition can be filled with the component (A) at a high filling ratio, making it possible to achieve a high thermal conductivity.

Component (A-1)

The component (A-1) is indefinite-shaped aluminum nitride particles having an average particle diameter of 30 to 150 μm. The aluminum nitride particles of the component (A-1) can significantly improve the thermal conductivity. Further, the thermally conductive polysiloxane composition using the component (A-1) has a low viscosity, as compared to a thermally conductive polysiloxane composition using spherical-shaped aluminum nitride particles having a similar average particle diameter in a similar amount. Therefore, a thermally conductive polysiloxane composition having excellent working properties and a high thermal conductivity can be obtained. Furthermore, the thermally conductive polysiloxane composition using the component (A-1) can be increased in the thermal conductivity, as compared to a thermally conductive polysiloxane composition using alumina particles having a similar average particle diameter in a similar amount.

The component (A-1) has an average particle diameter of 30 to 150 μm. The component (A-1) has a peak of the particle size distribution in the range of from 30 to 150 μm. The average particle diameter of the component (A-1) is 30 to 150 μm, and therefore, even when the polysiloxane composition is filled with the component (A) at a high filling ratio, for example, the component (A-1) does not settle, and the thermally conductive polysiloxane composition tends to be improved in stability, making it possible to reduce the viscosity of the composition and to improve the thermal conductivity. The average particle diameter of the component (A-1) is more preferably 50 to 120 μm, and especially preferably 60 to 100 μm.

In the present invention, the measured value of an average particle diameter is a median diameter (d50) as measured by a laser diffraction-scattering method.

The component (A) contains the component (A-1) in an amount of 20% by mass or more, based on the mass of a total of the component (A). The content of the component (A-1) in the component (A) can be less than 100% by mass. The content of the component (A-1) in the component (A) is more preferably 20 to 70% by mass, further preferably 25 to 65% by mass, and especially preferably 30 to 60% by mass. When the content of the component (A-1) is less than 20% by mass, the thermally conductive polysiloxane composition has a poor thermal conductivity. When the content of the component (A-1) is 70% by mass or less, the working properties are likely to be further improved.

The component (A-1) preferably has an oxygen content of less than 0.20% by mass. When the oxygen content of the component (A-1) is less than 0.20% by mass, the thermally conductive polysiloxane composition having a further reduced viscosity can be obtained. The oxygen content of the component (A-1) is more preferably 0.18% by mass or less, further preferably 0.15% by mass or less, and especially preferably 0.13% by mass or less. It is difficult to obtain the component (A-1) having an oxygen content of 0 from the viewpoint of the production, but the lower limit of the oxygen content of the component (A-1) is, for example, 0.001% by mass. The oxygen content can be measured by means of EMGA-920 (manufactured by HORIBA, Ltd.).

The aluminum nitride particles of the component (A-1) can be single crystal particles, polycrystal particles, amorphous particles, or a mixture thereof, but are preferably single crystal particles. When the aluminum nitride particles of the component (A-1) are single crystal particles, the thermally conductive polysiloxane composition having a further reduced viscosity can be obtained.

The aluminum nitride particles of the component (A-1) preferably have a specific surface area of 0.01 to 0.5 $m^2/g$, and more preferably 0.05 to 0.3 $m^2/g$, as measured by a BET method. When the specific surface area of the component (A-1) is in the above range, the thermally conductive polysiloxane composition having a further reduced viscosity can be obtained.

The aluminum nitride particles of the component (A-1) can be synthesized by, for example, a so-called direct nitriding method or reductive nitriding method. The aluminum nitride particles synthesized by a direct nitriding method can be, for example, further pulverized so as to have a particle diameter in an intended range. When the component (A-1) is the aluminum nitride particles synthesized by a direct nitriding method, the oxygen content of the component (A-1) can be controlled by a surface modification method. Further, the aluminum nitride particles of the component (A-1) are commercially available, and, for example, TOYALNITE (a registered trademark) TFZ-N60P, TFZ-N80P and TFZ-N100P, manufactured by Toyo Aluminum K.K., can be used.

With respect to the aluminum nitride particles of the component (A-1), one type of aluminum nitride particles may be individually used, or two or more types of aluminum nitride particles may be used in combination.

Component (A-2) and Component (A-3)

In the thermally conductive polysiloxane resin composition, for filling the composition with the thermally conductive filler (A) at a higher filling ratio to improve the thermal conductivity, it is preferred that the component (A) further comprises, as a thermally conductive filler having an average particle diameter different from that of the component (A-1), (A-2) inorganic particles having an average particle diameter of 1 to less than 30 µm and (A-3) inorganic particles having an average particle diameter of 0.1 to less than 1 µm. The present inventors have found that, as compared to a composition of a two-component system prepared from the component (A-1) and the component (A-3), the composition prepared from the component (A-1) and the component (A-3) as well as the component (A-2) is advantageous in that a difference in the particle diameters between the components is not too large and the efficiency of mixing the component (A) into a component (B) is further improved, so that a uniform composition can be easily obtained and the viscosity of the composition is more likely to be reduced.

The component (A-2) preferably has an average particle diameter of 1 to less than 30 µm. The component (A-2) has a peak of the particle size distribution in the range of from 1 to less than 30 µm. When the average particle diameter of the component (A-2) is 1 to less than 30 µm, the efficiency of mixing the components (A-1) to (A-3) into a component (B) is advantageously further improved, so that a uniform composition can be easily obtained and the viscosity of the composition is further reduced. The average particle diameter of the component (A-2) is more preferably 1 to 20 µm, further preferably 2 to 15 µm, and especially preferably 3 to less than 10 µm. The average particle diameter of the component (A-2) can be 1 to 10 µm.

The component (A-3) preferably has an average particle diameter of 0.1 to less than 1 µm. The component (A-3) has a peak of the particle size distribution in the range of from 0.1 to less than 1 µm. The average particle diameter of the component (A-3) is preferably 0.1 to less than 1 µm from the viewpoint of the thermal conductivity. The average particle diameter of the component (A-3) is more preferably 0.15 to 0.9 µm, and especially preferably 0.2 to 0.8 µm.

With respect to the blending ratio of the components (A-1) to (A-3), from the viewpoint of obtaining the uniform thermally conductive polysiloxane resin composition having a low viscosity and a high thermal conductivity, the component (A) preferably comprises 20 to 70% by mass of the component (A-1), 1 to 50% by mass of the component (A-2) and 1 to 50% by mass of the component (A-3), more preferably comprises 25 to 65% by mass of the component (A-1), 5 to 45% by mass of the component (A-2) and 5 to 45% by mass of the component (A-3), and especially preferably comprises 30 to 60% by mass of the component (A-1), 10 to 40% by mass of the component (A-2) and 10 to 40% by mass of the component (A-3).

With respect to the inorganic particles of the component (A-2) and the component (A-3), there is no particular limitation as long as the inorganic particles have a thermal conductivity. As the inorganic particles, for example, metal oxide particles, such as alumina, zinc oxide, magnesium oxide or silica; nitride particles, such as aluminum nitride or boron nitride; metal particles, such as aluminum, copper, silver or gold; or core-shell type particles of a metal/metal oxide can be used.

The inorganic particles of the component (A-2) are preferably aluminum nitride particles or alumina particles from the viewpoint of obtaining the uniform thermally conductive polysiloxane resin composition having a low viscosity and a high thermal conductivity.

The inorganic particles of the component (A-3) are preferably zinc oxide or alumina particles from the viewpoint of a high thermal conductivity and an improvement of the working properties.

Examples of shapes of the particles of the components (A-2) and (A-3) include, but are not limited to, a spherical shape, a round shape, an indefinite shape and a polyhedral shape. When the particles of the component (A-2) have a polyhedral shape, the thermally conductive polysiloxane resin composition is likely to have a higher thermal conductivity, and when the particles of the component (A-2) have a round shape, the composition is likely to have a further reduced viscosity.

With respect to each of the components (A-2) and (A-3), one type of the component may be individually used, or two or more types of the components may be used in combination.

In the thermally conductive polysiloxane resin composition, organic or inorganic particles other than the components (A-1) to (A-3) can be blended in such an amount that the effects of the present invention are not damaged.

[Component (B)]

A component (B) is at least one member selected from the group consisting of an alkoxysilyl group-containing compound and a dimethylpolysiloxane.

The alkoxysilyl group-containing compound of the component (B) is preferably a compound having per molecule at least an alkoxysilyl group represented by the following general formula:

$$—SiR^{11}{}_{3-z}(OR^{12})_z \qquad (I)$$

wherein $R^{11}$ is an alkyl group having 1 to 6 carbon atoms, and preferably a methyl group, $R^{12}$ is an alkyl group having 1 to 6 carbon atoms, and preferably a methyl group, and z is 1, 2 or 3, and there can be mentioned compounds of components (B-1) to (B-5) described below.

Component (B-1)

As an example of the alkoxysilyl group-containing compound of the general formula (I), there can be mentioned a compound of the general formula (1) below. In the alkoxysilyl group-containing compound, the unit containing $R^1$, the unit containing $R^2$, and the unit represented by $SiR^3{}_2O$ are not necessarily arranged as shown in the general formula (1) below, and it is understood that, for example, the unit represented by $SiR^3{}_2O$ may be present between the unit containing $R^1$ and the unit containing $R^2$.

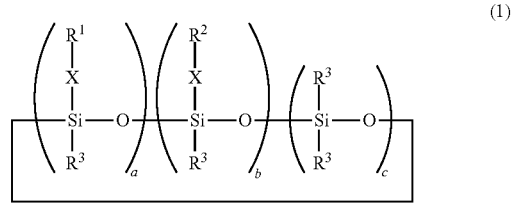

$$\left(\begin{array}{c} R^1 \\ | \\ X \\ | \\ Si-O \\ | \\ R^3 \end{array}\right)_a \left(\begin{array}{c} R^2 \\ | \\ X \\ | \\ Si-O \\ | \\ R^3 \end{array}\right)_b \left(\begin{array}{c} R^3 \\ | \\ Si-O \\ | \\ R^3 \end{array}\right)_c \qquad (1)$$

Wherein:

$R^1$ is a group having an alkoxysilyl group having 1 to 4 carbon atoms;

$R^2$ is a group having a siloxane unit represented by the following general formula (2):

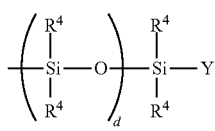
(2)

wherein each $R^4$ is independently a monovalent hydrocarbon group having 1 to 12 carbon atoms, Y is a group selected from the group consisting of $R^1$, $R^4$ and an aliphatic unsaturated group, and d is an integer of 2 to 500, preferably an integer of 4 to 400, more preferably an integer of 10 to 200 and especially preferably an integer of 10 to 60, or a monovalent hydrocarbon group having 6 to 18 carbon atoms;

each X is independently a divalent hydrocarbon group having 2 to 10 carbon atoms;

each of a and b is independently an integer of 1 or more;

c is an integer of 0 or more;

a+b+c is an integer of 4 or more; and each $R^3$ is independently a monovalent hydrocarbon group having 1 to 6 carbon atoms or a hydrogen atom.

As the alkoxysilyl group-containing compound of the component (B-1), compounds represented by the structural formulae below can be preferably used, but the component (B-1) is not limited to these compounds.

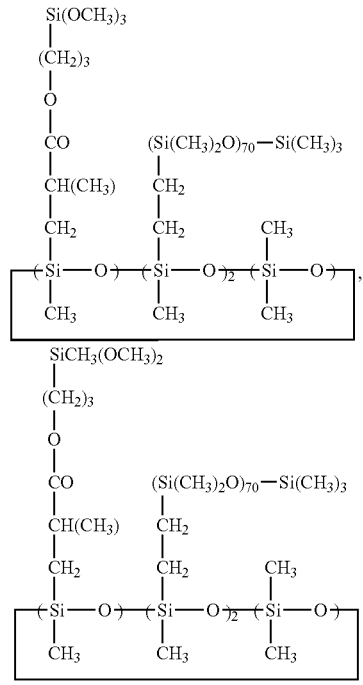

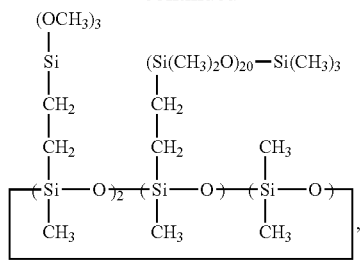

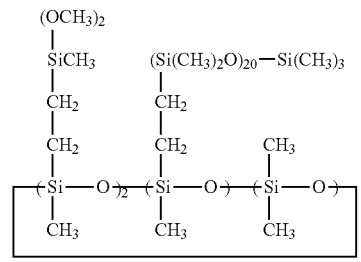

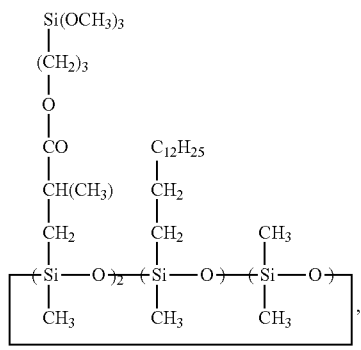

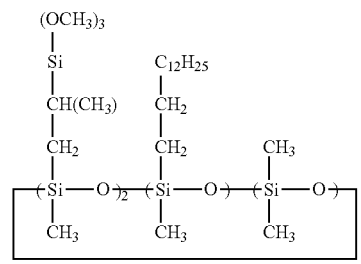

Further, as preferred examples of the alkoxysilyl group-containing compounds of the component (B-1), there can be mentioned compounds represented by the following structural formulae.

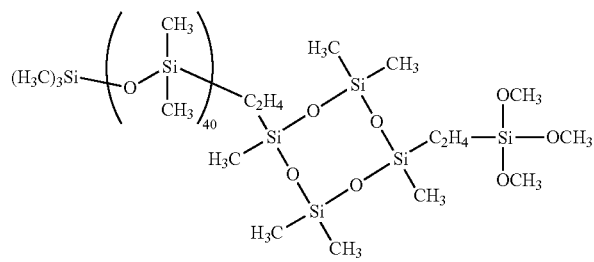

-continued
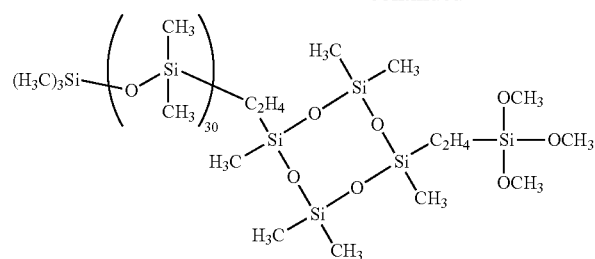
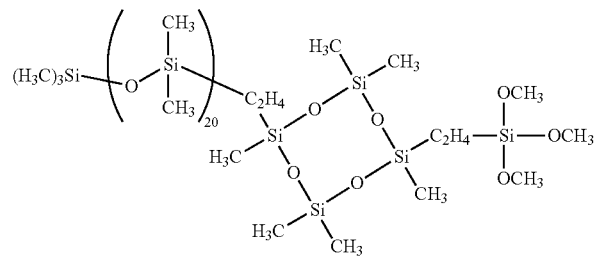
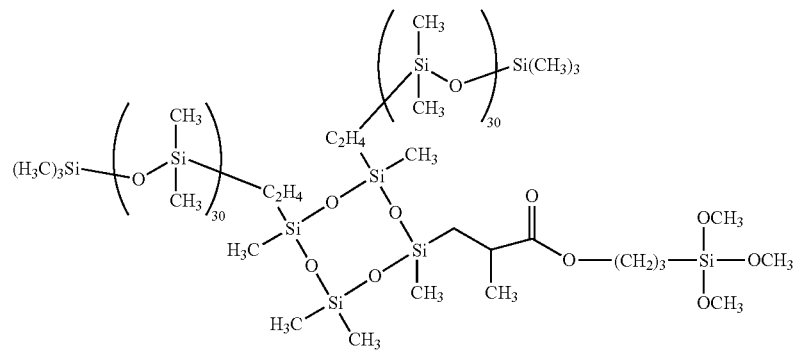
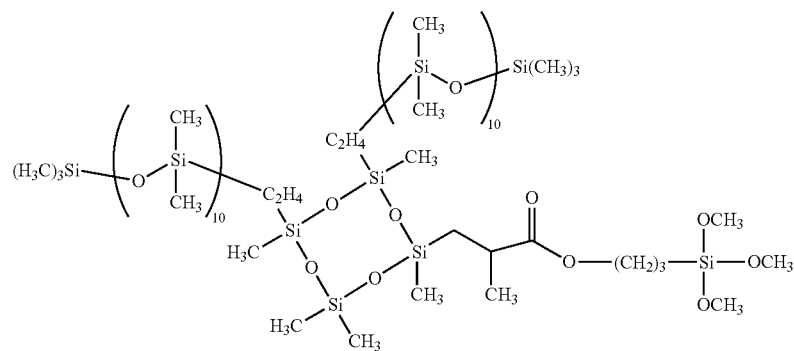
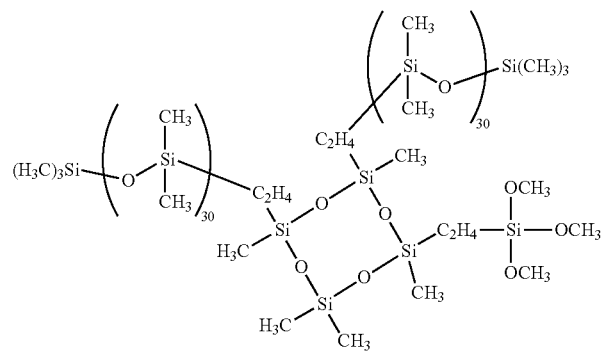

-continued

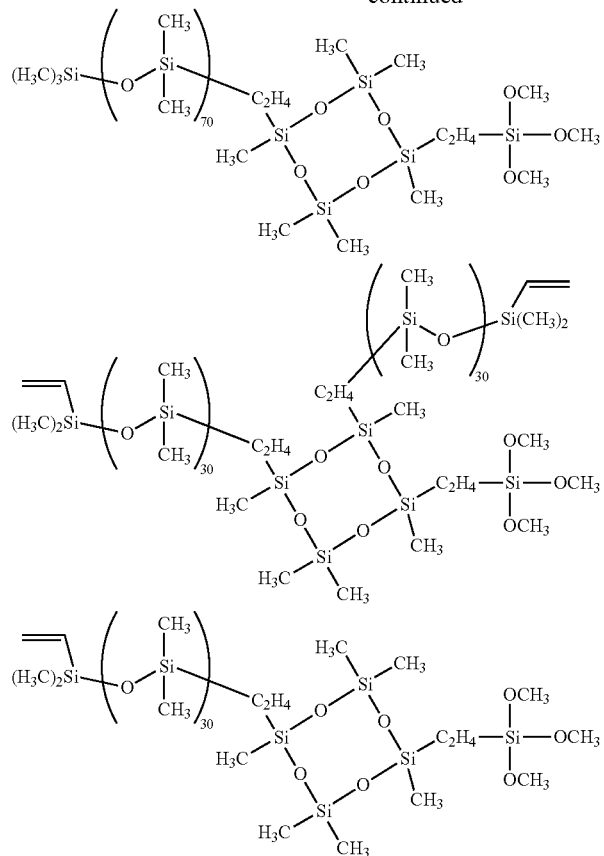

Component (B-2)

As the alkoxysilyl group-containing compound of the component (B), there can be used a compound represented by the following general formula (3):

$$R^{21}{}_{e}R^{22}{}_{f}Si(OR^{23})_{4-(e+f)} \quad (3)$$

wherein each $R^{21}$ is independently an alkyl group having 6 to 15 carbon atoms, each $R^{22}$ is independently an unsubstituted or substituted monovalent hydrocarbon group having 1 to 12 carbon atoms (excluding an alkyl group having 6 to 12 carbon atoms), each $R^{23}$ is independently an alkyl group having 1 to 6 carbon atoms, e is an integer of 0 to 3 and preferably 1, and f is an integer of 0 to 2, with the proviso that e+f is an integer of 1 to 3.

Examples of $R^{21}$'s include a hexyl group, an octyl group, a nonyl group, a decyl group, a dodecyl group and a tetradecyl group. When the alkyl group as $R^{21}$ has 6 to 15 carbon atoms, the component (B) is in a liquid state at room temperature so that it is easy to handle, and is likely to have a good wettability with the component (A).

Examples of $R^{22}$'s include alkyl groups, such as a methyl group, an ethyl group, a propyl group, an isopropyl group, a butyl group, an isobutyl group and a tert-butyl group; cycloalkyl groups, such as a cyclopentyl group, a cyclohexyl group and a cyclobutyl group; aliphatic unsaturated groups, such as a vinyl group and an allyl group; aryl groups, such as a phenyl group, a tolyl group, a xylyl group and a naphthyl group; aralkyl groups, such as a benzyl group, a 2-phenylethyl group, a 2-methyl-2-phenylethyl group and a phenylpropyl group; and groups obtained by substituting part of or all of hydrogen atoms of the above hydrocarbon groups with, e.g., a halogen atom, such as chlorine, fluorine or bromine, or a cyano group, for example, halogenated hydrocarbon groups, such as a chloromethyl group, a trifluoropropyl group, a 3,3,3-trifluoropropyl group, a 2-(nonafluorobutyl)ethyl group, a 2-(heptadecafluorooctyl)ethyl group, a chlorophenyl group, a bromophenyl group, a dibromophenyl group, a tetrachlorophenyl group, a fluorophenyl group and a difluorophenyl group, and cyanoalkyl groups, such as an α-cyanoethyl group, a β-cyanopropyl group and a γ-cyanopropyl group, and preferred are a methyl group and an ethyl group.

Examples of $R^{23}$'s include a methyl group, an ethyl group, a propyl group, a butyl group, a pentyl group and a hexyl group, and preferred are a methyl group and an ethyl group.

As examples of the alkoxysilyl group-containing compounds of the general formula (3) wherein e=1, there can be mentioned the following compounds.

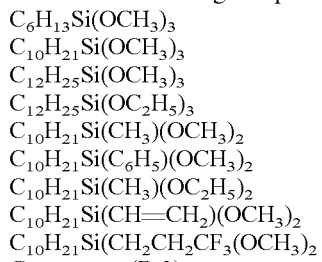

$C_6H_{13}Si(OCH_3)_3$
$C_{10}H_{21}Si(OCH_3)_3$
$C_{12}H_{25}Si(OCH_3)_3$
$C_{12}H_{25}Si(OC_2H_5)_3$
$C_{10}H_{21}Si(CH_3)(OCH_3)_2$
$C_{10}H_{21}Si(C_6H_5)(OCH_3)_2$
$C_{10}H_{21}Si(CH_3)(OC_2H_5)_2$
$C_{10}H_{21}Si(CH=CH_2)(OCH_3)_2$
$C_{10}H_{21}Si(CH_2CH_2CF_3)(OCH_3)_2$

Component (B-3)

As the alkoxysilyl group-containing compound of the component (B), there can be used a dimethylpolysiloxane having one end of the molecular chain blocked by an alkoxysilyl group and being represented by the following general formula (4):

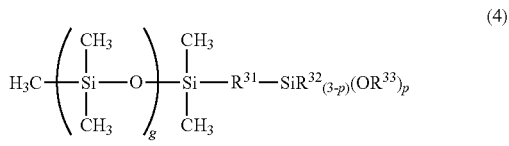

(4)

wherein $R^3$ is —O— or —CH$_2$CH$_2$—; each $R^{32}$ is independently an unsubstituted or substituted monovalent hydrocarbon group, specifically, includes groups mentioned as examples of $R^{22}$ in the general formula (3) above, and especially, is preferably an alkyl group or an aryl group, and more preferably a methyl group or a phenyl group; each $R^{33}$ is independently an alkyl group having 1 to 6 carbon atoms, and preferably a methyl group, an ethyl group, a propyl group, a butyl group or a hexyl group; g is an integer of 5 to 100, preferably 5 to 70 and especially preferably 10 to 50; and p is an integer of 1 to 3, and preferably 2 or 3.

One or more methyl groups in the general formula (4) may be substituted with a monovalent hydrocarbon group other than the methyl group. Examples of such substituents include alkyl groups, such as an ethyl group, a propyl group, a hexyl group and an octyl group; cycloalkyl groups, such as a cyclopentyl group and a cyclohexyl group; aryl groups, such as a phenyl group and a tolyl group; aralkyl groups, such as a 2-phenylethyl group and a 2-methyl-2-phenylethyl group; and halogenated hydrocarbon groups having 1 to 10 carbon atoms, such as a 3,3,3-trifluoropropyl group, a 2-(nonafluorobutyl)ethyl group, a 2-(heptadecafluorooctyl) ethyl group and a p-chlorophenyl group.

Component (B4)

As the alkoxysilyl group-containing compound of the component (B), there can be used a compound having both ends of the molecular chain blocked by alkoxysilyl groups and being represented by the following general formula (5):

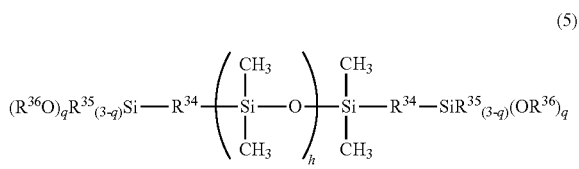

(5)

wherein $R^{34}$, $R^{35}$, $R^{36}$ and q are independently synonymous with $R^{31}$, $R^{32}$, $R^{33}$ and p in the general formula (4), respectively, and h is an integer such that the viscosity of the component (B-4) at 23° C. is 10 to 10,000 mPa·s, and more preferably 20 to 5,000 mPa·s.

One or more methyl groups in the general formula (5) may be substituted with a monovalent hydrocarbon group other than the methyl group. As examples of such substituents, there can be mentioned substituents that are mentioned as examples of groups with which the methyl group can be substituted in the general formula (4).

Examples of the alkoxysilyl group-containing compounds represented by the general formula (5) include a dimethylpolysiloxane having both ends blocked by methyldimethoxy groups and a dimethylpolysiloxane having both ends blocked by trimethoxy groups.

Component (B-5)

As the dimethylpolysiloxane of the component (B), there can be used a linear compound represented by the following general formula (6):

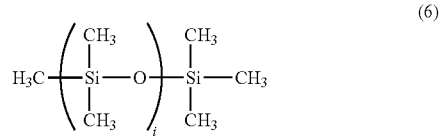

(6)

wherein i is an integer such that the viscosity of the component (B-5) at 23° C. is 10 to 10,000 mPa·s, and more preferably 20 to 5,000 mPa·s.

One or more methyl groups in the general formula (6) may be substituted with a monovalent hydrocarbon group other than the methyl group. As examples of such substituents, there can be mentioned substituents that are mentioned as examples of groups with which the methyl group can be substituted in the general formula (4).

As the component (B), the component (B-1) is preferred in view of an improvement of the working properties.

The amount of the component (B) contained in the thermally conductive polysiloxane composition is, relative to 100 parts by mass of the component (A), preferably 0.1 to 30 parts by mass, more preferably 0.5 to 20 parts by mass, and especially preferably 1 to 10 parts by mass.

One type of the component (B) may be individually used, or two or more types of the components (B) may be used in combination.

[Other Components]

The thermally conductive polysiloxane composition can contain a component other than the components (A) and (B) according to, for example, the purpose of use of the composition and the method for using the composition.

[Component (C)]

As a component (C) which is a polyorganosiloxane containing one or more aliphatic unsaturated groups per molecule, there can be used a compound represented by the following average compositional formula (II):

$$R^{41}_jR^{42}_kSiO_{[4-(j+k)]/2} \qquad (II)$$

wherein $R^{41}$ is an aliphatic unsaturated group, $R^{42}$ is a substituted or unsubstituted monovalent hydrocarbon group containing no aliphatic unsaturated bond, and each of j and k is a positive number that satisfies the relationships: $0<j<3$, $0<k<3$ and $1<j+k<3$.

$R^{41}$ is preferably an aliphatic unsaturated group having 2 to 8 carbon atoms, and examples of such aliphatic unsaturated groups include a vinyl group, an allyl group, a propenyl group, a 1-butenyl group and a 1-hexenyl group, and preferred is a vinyl group. One or more and preferably two or more aliphatic unsaturated groups are contained per molecule. The aliphatic unsaturated group may be bonded to a silicon atom at an end of the molecular chain, may be bonded to a silicon atom in the middle of the molecular chain, or may be bonded to both of them.

As specific examples of $R^{42}$'s, there can be mentioned groups that are mentioned as examples of $R^{22}$ in the general formula (3), excluding aliphatic unsaturated groups, such as a vinyl group and an allyl group. Of these, preferred are alkyl groups and aryl groups, and more preferred are a methyl group and a phenyl group.

Each of j and k is preferably a number that satisfies the relationships: $0.0005 \le j \le 1$, $1.5 \le k < 2.4$ and $1.5 < j+k < 2.5$, and more preferably a number that satisfies the relationships: $0.001 \leq j \leq 0.5$, $1.8 \leq 2.1$ and $1.8 < j+k \leq 2.2$.

The molecular structure of the component (C) can be linear, branched or cyclic, and is preferably linear or branched.

The component (C) preferably has a viscosity at 23° C. of 10 to 10,000 mPa·s, and more preferably 20 to 5,000 mPa·s.

When the composition contains the component (C), relative to 100 parts by mass of the component (A), the total amount of the component (B) and the component (C) contained is 1.5 to 35 parts by mass, preferably 1.5 to 30 parts by mass, and more preferably 1.5 to 28 parts by mass. The component (B) and the component (C) are blended so that the proportion of the component (C) contained in the total of the component (B) and the component (C) becomes 15 to 98% by mass, preferably 18 to 98% by mass, and more preferably 20 to 98% by mass.

One type of the component (C) may be individually used, or two or more types of the components (C) may be used in combination.

[Component (D)]

A component (D) is a polyorganohydrogensiloxane having two or more hydrogen atoms bonded to silicon atoms per molecule, and is a component which serves as a crosslinking agent for the component (C) and the component (B), wherein the component (B) is an alkoxysilyl group-containing compound having at least one aliphatic unsaturated group (for example, a compound of the general formula (1) wherein Y in $R^2$ is an aliphatic unsaturated group, a compound of the general formula (3) wherein $R^{22}$ is an aliphatic unsaturated group, a compound of the general formula (4) wherein $R^{32}$ is an aliphatic unsaturated group, or a compound of the general formula (5) wherein $R^{35}$ is an aliphatic unsaturated group). The component (D) has two or more and preferably three or more hydrogen atoms bonded to silicon atoms per molecule. The hydrogen atom may be bonded to a silicon atom at an end of the molecular chain, may be bonded to a silicon atom in the middle of the molecular chain, or may be bonded to both of them. Alternatively, a polyorganohydrogensiloxane having hydrogen atoms bonded only to silicon atoms at both ends can be used. The molecular structure of the component (D) may be any of linear, branched, cyclic and three-dimensional network structures, and any one of the structures may be individually used, or two or more thereof may be used in combination.

As the component (D), there can be used a compound represented by the following average compositional formula (III):

$$R^{51}{}_m H_n SiO_{[4-(m+n)]/2} \quad (III)$$

wherein $R^{51}$ is a substituted or unsubstituted monovalent hydrocarbon group containing no aliphatic unsaturated bond, and each of m and n is a number that satisfies the relationships: $0.5 \leq m \leq 2$, $0 < n \leq 2$ and $0.5 < m+n \leq 3$.

As specific examples of $R^{51}$'s, there can be mentioned groups that are mentioned as examples of $R^{22}$ in the general formula (3), excluding aliphatic unsaturated groups, such as a vinyl group and an allyl group. Of these, in view of easy synthesis of the compound and the cost, alkyl groups are preferred, and a methyl group is more preferred.

Each of m and n is preferably a number that satisfies the relationships: $0.6 \leq m \leq 1.9$, $0.01 \leq n \leq 1.0$ and $0.6 \leq m+n \leq 2.8$.

The component (D) preferably has a viscosity at 23° C. of 10 to 500 mPa·s.

The component (D) is blended in such an amount that the number of hydrogen atoms bonded to silicon atoms in the component (D) becomes 0.1 to 1.5 and preferably 0.2 to 1.2, relative to one of aliphatic unsaturated groups bonded to silicon atoms of the component (C) and the component (B), wherein the component (B) is an alkoxysilyl group-containing compound having at least one aliphatic unsaturated group. When the blending amount of the component (D) is in the above range, the thermally conductive polysiloxane composition has a good stability over time, and the cross-linking degree in the composition being cured is likely to be satisfactory, obtaining a cured product having an appropriate hardness.

[Component (E)]

A component (E) is a platinum-based catalyst, and is a component which accelerates curing after mixing the component (C) and the component (B), wherein the component (B) is an alkoxysilyl group-containing compound having at least one aliphatic unsaturated group, with the component (D). As the component (E), a well-known catalyst for use in a hydrosilylation reaction can be used. Examples of such catalysts include platinum black, platinum(IV) chloride, chloroplatinic acid, a reaction product of chloroplatinic acid and a monohydric alcohol, a complex of chloroplatinic acid and an olefin or vinylsiloxane, a platinum-vinyltetramer complex and platinum bisacetoacetate. The blending amount of the component (E) can be appropriately selected according to, for example, a desired curing rate, and is preferably in the range of 0.1 to 1,000 ppm, in terms of a platinum element, based on the total amount of the component (C), the component (B), wherein the component (B) is an alkoxysilyl group-containing compound having at least one aliphatic unsaturated group, and the component (D). One type of the component (E) may be individually used, or two or more types of the components (E) may be used in combination.

Further, for obtaining a longer pot life, the activity of the catalyst can be suppressed by adding (E-2) a reaction inhibitor. Examples of known reaction inhibitors for metals of the platinum group include acetylenic alcohols, such as 2-methyl-3-butyn-2-ol and 1-ethynyl-2-cyclohexanol.

[Component (F)]

A component (F) is a condensation catalyst, and is a component which accelerates condensation or curing of the component (B) when the component (B) comprises an alkoxysilyl group-containing compound. As the component (F), a known silanol condensation catalyst can be used. Examples of such condensation catalysts include metal-based catalysts, e.g., titanates, such as tetrabutyl titanate and tetrapropyl titanate; organotin compounds, such as dibutyltin dilaurate, dibutyltin maleate and dibutyltin diacetate; tin carboxylates, such as tin octylate, tin naphthenate, tin laurate and tin versatate; reaction products of dibutyltin oxide and a phthalate; dibutyltin diacetylacetonate; organoaluminum compounds, such as aluminum triacetylacetonate, aluminum trisethylacetoacetate and diisopropoxyaluminum ethylacetoacetate; chelate compounds, such as diisopropoxy-bis (ethyl acetoacetate) titanium, zirconium tetraacetylacetonate and titanium tetraacetylacetonate; lead octylate; iron naphthenate; and bismuth compounds, such as bismuth-tris(neodecanoate) and bismuth-tris(2-ethylhexoate). Further, a known amine-based catalyst, such as laurylamine, may be used. Of these, especially preferred are tin carboxylates or organotin compounds, such as dibutyltin dilaurate, dibutyltin maleate, dibutyltin diacetate, tin octylate, tin naphthenate, tin laurate and tin versatate; reaction products of dibutyltin oxide and a phthalate; and tin-based catalysts, such as dibutyltin diacetylacetonate.

The blending amount of the component (F) can be appropriately selected according to, for example, a desired curing rate, and is 0.01 to 10 parts by mass, preferably 0.05 to 8.0 parts by mass, and more preferably 0.1 to 5.0 parts by mass, relative to 100 parts by mass of the alkoxysilyl group-containing compound in the component (B).

One type of the component (F) may be individually used, or two or more types of the components (F) may be used in combination.

[Component (G)]

The thermally conductive polysiloxane composition, if necessary, can further contain, for example, a flame retardancy imparting agent, a heat resistance improving agent, a plasticizer, a coloring agent, a tackifier, or a diluent in such an amount that the purposes of the present invention are not damaged.

[Preferred Embodiments of the Composition]

The thermally conductive polysiloxane composition can contain the component (A) and the component (B) as well as further the above-mentioned other components, so as to be preferred embodiments of the composition of items 1 to 3 below.

1. Grease-Type Thermally Conductive Polysiloxane Composition

The thermally conductive polysiloxane composition can contain only the component (A) and the component (B), or can contain the component (A) and the component (B) and further the component (C), so as to be a grease-type thermally conductive polysiloxane composition. In this embodiment, the thermally conductive polysiloxane composition as such can be used as a heat dissipation material without being cured. The grease-type thermally conductive polysiloxane composition may further contain at least one member selected from the group consisting of the components (D) to (G), but preferably does not contain any one of the components (D) to (F).

2. Addition Reaction-Type Thermally Conductive Polysiloxane Composition

The thermally conductive polysiloxane composition can contain the component (A) and the component (B), wherein the component (B) is an alkoxysilyl group-containing compound having at least one aliphatic unsaturated group (for example, a compound of the general formula (1) wherein Y in $R^2$ is an aliphatic unsaturated group, a compound of the general formula (3) wherein $R^{22}$ is an aliphatic unsaturated group, a compound of the general formula (4) wherein $R^{32}$ is an aliphatic unsaturated group, or a compound of the general formula (5) wherein $R^{35}$ is an aliphatic unsaturated group), as well as further the component (D) and the component (E). Alternatively, the thermally conductive polysiloxane composition can contain the component (A) and the component (B) as well as further the components (C), (D) and (E). In this embodiment, the thermally conductive polysiloxane composition can be cured by an addition reaction, and it is preferred in that a heat dissipation material comprising a cured product of the thermally conductive polysiloxane composition can be obtained. In the latter, the component (B) may have or may not have an aliphatic unsaturated group. The addition reaction-type thermally conductive polysiloxane composition may further contain at least one member selected from the group consisting of the component (F) and the component (G).

3. Condensation Reaction-Type Thermally Conductive Polysiloxane Composition

The thermally conductive polysiloxane composition can contain the component (A) and the component (B), wherein the component (B) comprises an alkoxysilyl group-containing compound, and further the component (F). In this embodiment, the thermally conductive polysiloxane composition can be cured by a condensation reaction, and it is preferred in that a heat dissipation material comprising a cured product of the thermally conductive polysiloxane composition can be obtained. The condensation reaction-type thermally conductive polysiloxane composition may further contain at least one member selected from the group consisting of the components (C), (D), (E) and (G).

In an embodiment of the condensation reaction-type thermally conductive polysiloxane composition, the component (B) comprises at least an alkoxysilyl group-containing compound. The alkoxysilyl group-containing compound of the component (B) is preferably a dimethylpolysiloxane containing a dialkoxysilyl group or a trialkoxysilyl group at both ends of the molecular chain or one end of the molecular chain, and especially preferably a dimethylpolysiloxane containing a dialkoxysilyl group or a trialkoxysilyl group at both ends of the molecular chain.

[Method for Producing the Thermally Conductive Polysiloxane Composition]

The thermally conductive polysiloxane composition can be obtained by mixing the component (A) and the component (B) and further, if necessary, the other arbitrary components by means of a mixing machine, such as a planetary mixer. If necessary, the mixing may be conducted while heating at a temperature in the range of from 50 to 150° C. For achieving further uniform finishing, a kneading operation under high shear force is preferably performed. Examples of kneading apparatuses include a three-roll mill, a colloid mill and a sand grinder, and, of these, preferred is a method using a three-roll mill.

[Method for Curing the Thermally Conductive Polysiloxane Composition]

As examples of methods for curing the addition reaction-type thermally conductive polysiloxane composition, there can be mentioned a method in which the composition is applied to an adherend which needs to remove heat, and then the applied composition is allowed to stand at room temperature, and a method in which the applied composition is heated at a temperature of 50 to 200° C. From the viewpoint of quickly curing the composition, the method in which the composition is heated is preferably employed.

As examples of methods for curing the condensation reaction-type thermally conductive polysiloxane composition, there can be mentioned a method in which the composition is applied to an adherend which needs to remove heat, and then the applied composition is allowed to stand at room temperature so that the composition is cured due to moisture in air, and a method in which the applied composition is cured under humidified conditions.

[Heat Dissipation Material]

The thermally conductive polysiloxane composition or a heat dissipation material comprising the thermally conductive polysiloxane composition has a thermal conductivity of 2.0 W/(m·K) or more, preferably 2.5 W/(m·K) or more, and more preferably 3.0 W/(m·K) or more, as measured at 23° C. by a hot wire method. For controlling the thermal conductivity to enhance the heat dissipation effect, the content of the component (A) in the composition is preferably 80% by mass or more, and the content of the component (A) can be increased according to the required thermal conductivity.

The heat dissipation material can be used as a heat dissipation material for a PC/server having mounted a CPU which generates a large amount of heat, and for electronic devices having mounted a power module, a VLSI (a very large scale integrated circuit) or an optical part (an optical pickup or an LED), household electrical appliances (e.g., AV devices, such as a DVD/HDD recorder (player) and an FPD), PC peripheral devices, home video game machines, automobiles, and industrial devices, such as an inverter and a switching power supply. The heat dissipation material can have a form, such as a grease form (a paste form), a gel form or a rubber form.

EXAMPLES

<Components to be Used in Examples>
Component (A-1)
AlN-1: Indefinite-shaped aluminum nitride particles (single crystal particles); Average particle diameter: 60 μm; Oxygen content: 0.21% by mass
AlN-2: Indefinite-shaped aluminum nitride particles (single crystal particles) obtained by treating AlN-1 by a surface modification method; Average particle diameter 60 μm; Oxygen content: 0.10% by mass
AlN-3: Indefinite-shaped aluminum nitride particles obtained by treating indefinite-shaped aluminum nitride particles (single crystal particles; Average particle diameter 80 μm) by a surface modification method; Average particle diameter: 80 μm; Oxygen content: 0.09% by mass
AlN-4: Indefinite-shaped aluminum nitride particles obtained by treating indefinite-shaped aluminum nitride particles (single crystal particles; Average particle diameter 100 μm) by a surface modification method; Average particle diameter: 100 μm; Oxygen content: 0.08% by mass
Component (A'): Other thermally conductive fillers
Spherical-shaped aluminum nitride particles (granulated particles); Average particle diameter: 80 μm
Spherical-shaped aluminum nitride particles (granulated particles); Average particle diameter: 50 μm
Spherical-shaped alumina particles; Average particle diameter 75 μm
Component (A-2)
Spherical-shaped aluminum nitride particles; Average particle diameter 5 μm
$Al_2O_3$-2: Round-shaped alumina particles; Average particle diameter: 3.3 μm
$Al_2O_3$-1: Polyhedral-shaped alumina particles; Average particle diameter: 4.7 μm
Indefinite-shaped alumina particles; Average particle diameter: 18 μm
Component (A-3) Round-shaped alumina particles; Average particle diameter 0.5 μm
Component (B-1)
Trialkoxy group-containing polyorganosiloxane:

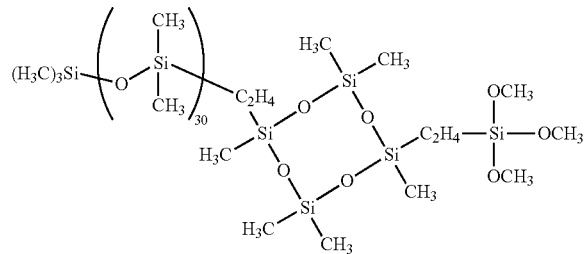

Component (B-2)
Methyltrimethoxysilane
Component (B4)
Dimethylpolysiloxane having both-ends blocked by methyldimethoxy groups (Viscosity: 100 mPa·s)
Component (B-5)
Dimethylpolysiloxane having both-ends blocked by trimethylsilyl groups (Viscosity: 30 mPa·s)
Component (C) Dimethylpolysiloxane having both-ends blocked by vinyl groups (Viscosity: 30 mPa·s)
Component (D)
Polyorganohydrogensiloxane: H Oil ($M^H D^H{}_8 D_8 M^H$)
Component (E)
Platinum-based catalyst: Vinyltetramer complex having a platinum content of 2%
Component (E-2)
Reaction inhibitor: 1-Ethynyl-1-cyclohexanol
Component (F)
Condensation catalyst: Diisopropoxy-bis(ethyl acetoacetate)titanium
<Measurement Methods>
[Average Particle Diameter]
An average particle diameter (a median diameter d50) was measured by a laser diffraction-scattering method.
[Viscosity]
A viscosity of the composition at 23° C. was measured in accordance with JIS K6249 by means of a rotational viscometer using a rotor No. 7 at the rotational speed of 2 rpm for 5 minutes.
[Thermal Conductivity]
A thermal conductivity was measured at 23° C. in accordance with a Hot disk method using a Hot Disk method thermal property measurement apparatus (TPS 1500, manufactured by Kyoto Electronics Manufacturing Co., Ltd.).

Examples 1 to 12 and Comparative Examples 1 to 6 (Addition Reaction-Type Thermally Conductive Polysiloxane Composition)

Components (A), (B) and (C) shown in Tables 1 and 2 were respectively placed into a planetary mixer (manufactured by DALTON Corporation), and mixed together and stirred at room temperature for one hour, and further mixed and stirred at 120° C. for one hour to obtain a mixture, and then the mixture was cooled to 25° C. Then, components (D), (E) and (E-2) were added to and mixed with the resultant mixture to obtain an addition reaction-type thermally conductive polysiloxane composition. A viscosity of the obtained composition was measured. The results are shown in Tables 1 and 2.
The addition reaction-type thermally conductive polysiloxane compositions of Examples 1 to 12 and Comparative Examples 1 to 6 were respectively cured in a mold by heating at 150° C. for one hour to obtain a cured product of the addition reaction-type thermally conductive polysiloxane composition having a thickness of 6 mm. A thermal conductivity of the obtained cured product was measured. The results are shown in Tables 1 and 2.

TABLE 1

| | Raw materials | Example1 | Example2 | Example3 | Example4 | Example5 | Example6 | Example7 | Example8 |
|---|---|---|---|---|---|---|---|---|---|
| (A-1) | AlN-1: Indefinite-shaped aluminum nitride particles having an average particle diameter of 60 μm (oxygen content 0.21% by mass) | 44.81 | | | | 48.04 | | | |

TABLE 1-continued

| | Raw materials | Example1 | Example2 | Example3 | Example4 | Example5 | Example6 | Example7 | Example8 |
|---|---|---|---|---|---|---|---|---|---|
| | AlN-2: Indefinite-shaped aluminum nitride particle having an average particle diameter of 60 μm (oxygen content 0.10% by mass) | | | | | | | 48.04 | 44.81 |
| | AlN-3: Indefinite-shaped aluminum nitride particles having an average particle diameter of 80 μm (oxygen content 0.09% by mass) | 44.81 | 48.04 | 48.04 | | | | | |
| | AlN-4: Indefinite-shaped aluminum nitride particles having an average particle diameter of 100 μm (oxygen content 0.08% by mass) | | | | | 48.04 | | | |
| (A') | Spherical-shaped aluminum nitride particles having an average particle diameter of 80 μm | | | | | | | | |
| | Spherical-shaped aluminum nitride particles having an average particle diameter of 50 μm | | | | | | | | |
| | Spherical-shaped alumina particles having an average particle diameter of 75 μm | | | | | | | | |
| (A-2) | Spherical-shaped aluminum nitride particles having an average particle diameter of 5 μm | 28.01 | 28.01 | | | | | | 28.01 |
| | Al₂O₃-2: Round-shaped alumina particles having an average particle diameter of 3.3 μm | | | 26.06 | 26.06 | 26.06 | 26.06 | | |
| | Al₂O₃-1: Polyhedral-shaped alumina particles having an average particle diameter of 4.7 μm | | | | 26.06 | | | | |
| | Indefinite-shaped alumina particles having an average particle diameter of 18 μm | | | | | | | | |
| (A-3) | Round-shaped alumina particles having an average particle diameter of 0.5 μm | 20.52 | 20.52 | 19.55 | 19.55 | 19.55 | 19.55 | 19.55 | 20.52 |
| (B-1) | Trialkoxy group-containing polyorganosiloxane | 1.00 | 1.00 | 1.00 | 1.00 | 1.00 | 1.00 | 1.00 | 1.00 |
| (C) | Dimethylpolysiloxane having both-ends blocked by vinyl groups (viscosity: 30 mPa·s) | 5.13 | 5.13 | 4.82 | 4.82 | 4.82 | 4.82 | 4.82 | 4.82 |
| (D) | H Oil ($M^H D^H_8 D_8 M^B$) | 0.50 | 0.50 | 0.50 | 0.50 | 0.50 | 0.50 | 050 | 0.50 |
| (E) | Platinum-vinyltetramer complex (platinum content: 2%) | 0.01 | 0.01 | 0.01 | 0.01 | 0.01 | 0.01 | 0.01 | 0.01 |
| (E-2) | 1-Ethynyl-1-cyclohexanol | 0.02 | 0.02 | 0.02 | 0.02 | 0.02 | 0.02 | 0.02 | 0.02 |
| | The content of Component (A) (%) | 93.3% | 93.3% | 93.7% | 93.7% | 93.7% | 93.7% | 93.7% | 93.6% |
| | Viscosity Pa·s | 270 | 270 | 200 | 230 | 240 | 230 | 200 | 240 |
| | Thermal conductivity W/mK | 9.3 | 10.5 | 10.9 | 11.1 | 9.2 | 10.5 | 9.5 | 9.4 |

| | Raw materials | Example9 | Example10 | Comparative Example1 | Comparative Example2 | Comparative Example3 | Comparative Example4 |
|---|---|---|---|---|---|---|---|
| (A-1) | AlN-1: Indefinite-shaped aluminum nitride particles having an average particle diameter of 60 μm (oxygen content 0.21% by mass) | | 48.04 | | | | |
| | AlN-2: Indefinite-shaped aluminum nitride particle having an average particle diameter of 60 μm (oxygen content 0.10% by mass) | 48.04 | | | | | |
| | AlN-3: Indefinite-shaped aluminum nitride particles having an average particle diameter of 80 μm (oxygen content 0.09% by mass) | | | | | | |
| | AlN-4: Indefinite-shaped aluminum nitride particles having an average particle diameter of 100 μm (oxygen content 0.08% by mass) | | | | | | |
| (A') | Spherical-shaped aluminum nitride particles having an average particle diameter of 80 μm | | | 48.04 | | | |
| | Spherical-shaped aluminum nitride particles having an average particle diameter of 50 μm | | | | 48.04 | | |
| | Spherical-shaped alumina particles having an average particle diameter of 75 μm | | | | | 48.04 | 48.04 |

TABLE 1-continued

| | | | | | | | |
|---|---|---|---|---|---|---|---|
| (A-2) | Spherical-shaped aluminum nitride particles having an average particle diameter of 5 μm | | | | | | |
| | Al₂O₃-2: Round-shaped alumina particles having an average particle diameter of 3.3 μm | | | 26.06 | 26.06 | 26.06 | |
| | Al₂O₃-1: Polyhedral-shaped alumina particles having an average particle diameter of 4.7 μm | 26.06 | 26.06 | | | | |
| | Indefinite-shaped alumina particles having an average particle diameter of 18 μm | | | | | | 26.06 |
| (A-3) | Round-shaped alumina particles having an average particle diameter of 0.5 μm | 19.55 | 19.55 | 19.55 | 19.55 | 19.55 | 19.55 |
| (B-1) | Trialkoxy group-containing polyorganosiloxane | 1.00 | 1.00 | 1.00 | 1.00 | 1.00 | 1.00 |
| (C) | Dimethylpolysiloxane having both-ends blocked by vinyl groups (viscosity: 30 mPa·s) | 4.82 | 4.82 | 4.82 | 4.82 | 4.82 | 4.82 |
| (D) | H Oil ($M^H D^H_8 D_8 M^B$) | 0.50 | 0.50 | 0.50 | 0.50 | 0.50 | 0.50 |
| (E) | Platinum-vinyltetramer complex (platinum content: 2%) | 0.01 | 0.01 | 0.01 | 0.01 | 0.01 | 0.01 |
| (E-2) | 1-Ethynyl-1-cyclohexanol | 0.02 | 0.02 | 0.02 | 0.02 | 0.02 | 0.02 |
| | The content of Component (A) (%) | 93.7% | 93.7% | 93.7% | 93.7% | 93.7% | 93.7% |
| | Viscosity Pa·s | 266 | 284 | 530 | 520 | 110 | 66 |
| | Thermal conductivity W/mK | 10.5 | 10.0 | 10.8 | 8.1 | 6.3 | 6.1 |

TABLE 2

| | Raw materials | Example11 | Example12 | Comparative Example 5 | Comparative Example 8 |
|---|---|---|---|---|---|
| (A-1) | AlN - 1: Indefinite-shaped aluminum nitride particles having an average particle diameter of 60 μm (oxygen content: 0.21% by mass) | | 48.42 | | |
| | AlN - 2: Indefinite-shaped aluminum nitride particles having an average particle diameter of 60 μm (oxygen content: 0.10% by mass) | 48.42 | | | |
| (A') | Spherical-shaped aluminum nitride particles having an average particle diameter of 80 μm | | | 48.42 | |
| | Spherical-shaped aluminum nitride particles having an average particle diameter of 50 μm | | | | 48.42 |
| (A-2) | Al₂O₃ - 2: Round-shaped alumina particles having an average particle diameter of 3.3 μm | 26.26 | 28.26 | 26.26 | 26.26 |
| (A-3) | Round-shaped alumina particles having an average particle diameter of 0.5 μm | 19.70 | 19.70 | 19.70 | 19.70 |
| (B-1) | Trialkoxy group-containing polyorganosiloxane | 1.00 | 1.00 | 1.00 | 1.00 |
| (C) | Dimethylpolysiloxane having both-ends blocked by vinyl groups (viscosity: 30 mPa·s) | 4.16 | 4.16 | 4.18 | 4.1S |
| (D) | H Oil ($M^H D^H_2 D_2 M^H$) | 0.43 | 0.43 | 0.43 | 0.43 |
| (E) | Platinum-vinyltetramer complex (platinum content: 2%) | 0.01 | 0.01 | 0.01 | 0.01 |
| (E-2) | 1-Ethyl-1-cyclohexanol | 0.02 | 0.02 | 0.02 | 0.02 |
| | The content of Component (A) (%) | 94.4% | 94.4% | 94.4% | 94.4% |
| | Viscosity Pa·s | 586 | 908 | 1680 | 970 |
| | Thermal conductivity W/mK | 12.1 | 12.5 | 12.2 | 9.5 |

A comparison is made between Example 4 and Comparative Example 1. In the composition of Example 4, the thermally conductive filler as a component (A) comprises two or more thermally conductive fillers having different average particle diameters, and contains (A-1) indefinite-shaped aluminum nitride particles having an average particle diameter of 30 to 150 μm in an amount of 20% by mass or more, based on the mass of a total of the component (A). It is apparent that the composition of Example 4 has a low viscosity, as compared to the composition of Comparative Example 1 using, instead of the component (A-1), spherical-shaped aluminum nitride particles having a similar particle diameter in a similar amount. Further, it is found that the composition of Example 4 has a high thermal conductivity, as compared to the composition of Comparative Example 3 using, instead of the component (A-1), spherical-shaped alumina particles having an almost similar particle diameter in a similar amount.

From a comparison between Examples 1, 2 and 8, a comparison between Examples 4 to 7, and a comparison between Examples 3, 9, and 10, respectively, it is apparent that indefinite-shaped aluminum nitride particles having an average particle diameter of 80 μm are especially preferably used as the component (A-1) because a high thermal conductivity can be achieved.

From a comparison between Examples 1 and 8, a comparison between Examples 5 and 7, a comparison between Examples 9 and 10, and a comparison between Examples 11 and 12, respectively, it is apparent that Examples 8, 7, 9 and 11 in which the oxygen content of the each component (A-1) is less than 0.20% by mass are especially preferred because a further reduced viscosity is achieved.

From a comparison between Examples 1, 5 and 10, a comparison between Examples 2 to 4, and a comparison between Examples 7 to 9, respectively, it is apparent that, irrespective of whether the component (A-2) comprises aluminum nitride particles or alumina particles, both a low viscosity and a high thermal conductivity can be achieved, and the effect of the composition of the component (A-2) on these properties is relatively small.

From a comparison between Examples 5 and 10, and a comparison between Examples 7 and 9, respectively, it is apparent that the compositions of Examples 10 and 9 using polyhedral-shaped alumina particles as the component (A-2) have excellent thermal conductivities, and that the compositions of Examples 5 and 7 using round-shaped alumina particles as the component (A-2) have further reduced viscosities.

a total of the component (A), is effective in reducing the viscosity of the thermally conductive polysiloxane composition.

Example 13 (Condensation Reaction-Type Thermally Conductive Polysiloxane Composition)

Components (A) and (B) shown in Table 3 were placed into a planetary mixer (manufactured by DALTON Corporation), and mixed together and stirred at room temperature for one hour, and further mixed and stirred at 120° C. for one hour to obtain a mixture, and then the mixture was cooled to 25° C. Then, a component (F) was added to and mixed with the resultant mixture to obtain a condensation reaction-type thermally conductive polysiloxane composition. A viscosity of the obtained composition was measured. The results are shown in Table 3.

With respect to the condensation reaction-type thermally conductive polysiloxane composition of Example 13, a mold having a thickness of 6 mm was filled with the composition and, without a cover, the composition was allowed to stand under conditions at 23° C. and at 50% RH for 14 days to obtain a cured product of the condensation reaction-type thermally conductive polysiloxane composition. A thermal conductivity of the obtained cured product was measured. The results are shown in Table 3.

TABLE 3

| | Raw materials | Example 13 |
|---|---|---|
| (A-1) | AlN-1: indefinite-shaped aluminum nitride particles having an average particle diameter of 60 μm (oxygen content: 0.21% by mass) | 44.24 |
| (A-2) | Spherical-shaped aluminum nitride particles having an average particle diameter of 5 μm | 27.65 |
| (A-3) | Round-shaped alumina particles having an average particle diameter of 0.5 μm | 20.25 |
| (B-1) | Trialkoxy group-containing polyorganosiloxane | 6.52 |
| (B-2) | Methyltrimethoxysilane | 0.50 |
| (B-4) | Dimethylpolysiloxane having both-ends blocked by methyldimethoxy groups (viscosity: 100 mPa·s) | 0.34 |
| (F) | Diisopropoxy-bis(ethyl acetoacetate)titanium | 0.50 |
| | The content of Component (A) (%) | 92.1% |
| | Viscosity Pa·s | 160 |
| | Thermal conductivity W/mK | 11.0 |

From a comparison between Examples 7 and 11, and a comparison between Examples 5 and 12, respectively, it is apparent that the compositions of Examples 11 and 12, in which the each filling ratio of the thermally conductive filler as the component (A) is increased, have higher thermal conductivities than those of the compositions of Examples 7 and 5, respectively.

In the thermally conductive polysiloxane compositions shown in Table 2, the content of the component (A) is increased to 94.4% for further increasing the thermal conductivity. Each of the compositions of Examples 11 and 12 using indefinite-shaped aluminum nitride particles having an average particle diameter of 60 μm as the component (A-1) has an increased viscosity due to the effect of the increase of the content of the component (A), as compared to the compositions of Examples 1 to 10, but has a low viscosity, as compared to the compositions of Comparative Examples 5 and 6 using spherical-shaped aluminum nitride particles having average particle diameters of 80 μm and 50 μm, respectively, instead of the above component (A-1). As apparent from this result, the use of the component (A-1) in an amount of 20% by mass or more, based on the mass of In Example 13, the thermally conductive filler as a component (A) comprises two or more thermally conductive fillers having different average particle diameters, and contains (A-1) indefinite-shaped aluminum nitride particles having an average particle diameter of 30 to 150 m in an amount of 20% by mass or more, based on the 10 mass of a total of the component (A), and a component (B) comprises an alkoxysilyl group-containing compound, and the composition further contains a condensation catalyst (F). Thus, in Example 13, a condensation reaction-type thermally conductive polysiloxane composition having a low viscosity and a high thermal conductivity can be obtained.

Example 14 (Grease-Type Thermally Conductive Polysiloxane Composition)

Components (A) and (B) shown in Table 4 were placed into a planetary mixer (manufactured by DALTON Corporation), and mixed together and stirred at room temperature for one hour, and further mixed and stirred at 120° C. for one hour to obtain a mixture, and then the mixture was cooled to 25° C., obtaining a grease-type thermally conductive polysiloxane composition. A viscosity of the obtained composition was measured. The results are shown in Table 4.

With respect to the grease-type thermally conductive polysiloxane composition of Example 14, a thermal conductivity was measured at a thickness of 6 mm. The results are shown in Table 4.

TABLE 4

| | Raw materials | Example 14 |
|---|---|---|
| (A-1) | AlN-3: Indefinite-shaped aluminum nitride particles having an average particle diameter of 80 µm (oxygen content: 0.09% by mass) | 44.81 |
| (A-2) | Spherical-shaped aluminum nitride particles having an average particle diameter of 5 µm | 28.01 |
| (A-3) | Round-shaped alumina particles having an average particle diameter of 0.5 µm | 20.52 |
| (B-1) | Trialkoxy group-containing polyorganosiloxane | 1.00 |
| (B-5) | Dimethylpolysiloxane having both-ends blocked by trimethylsilyl groups (viscosity: 30 mPa·s) | 5.66 |
| | The content of Component (A) (%) | 93.3% |
| | Viscosity Pa·s | 270 |
| | Thermal conductivity W/mK | 8.9 |

In Example 14, the thermally conductive filler as a component (A) comprises two or more thermally conductive fillers having different average particle diameters, and contains (A-1) indefinite-shaped aluminum nitride particles having an average particle diameter of 30 to 150 µm in an amount of 20% by mass or more, based on the mass of a total of the component (A), and the composition contains (B) at least one member selected from the group consisting of an alkoxysilyl group-containing compound and a dimethylpolysiloxane. Thus, in Example 14, a grease-type thermally conductive polysiloxane composition having a low viscosity and a high thermal conductivity can be obtained.

INDUSTRIAL APPLICABILITY

The thermally conductive polysiloxane composition of the present invention can be used as a heat dissipation material for various types of devices having a heat generating site, e.g., electronic devices, such as a personal computer.

The invention claimed is:

1. A thermally conductive polysiloxane composition comprising:
    (A) a thermally conductive filler; and
    (B) at least one member selected from the group consisting of an alkoxysilyl group-containing compound and a dimethylpolysiloxane,
    wherein the component (A) comprises at least two thermally conductive fillers having different average particle diameters;
    wherein the component (A) comprises (A-1) indefinite-shaped aluminum nitride particles having an average particle diameter of 30 µm to 150 µm as one of the at least two thermally conductive fillers; and
    wherein an amount of the component (A-1) is at least 20% by mass, based on the mass of a total of the component (A).

2. The thermally conductive polysiloxane composition according to claim 1, wherein the component (A-1) has an oxygen content of less than 0.20% by mass.

3. The thermally conductive polysiloxane composition according to claim 2, wherein the aluminum nitride particles of the component (A-1) are single crystal particles.

4. The thermally conductive polysiloxane composition according to claim 2, wherein the component (A) comprises:

20% to 70% by mass of the component (A-1);
1% to 50% by mass of (A-2) inorganic particles having an average particle diameter of 1 µm to less than 30 µm; and
1% to 50% by mass of (A-3) inorganic particles having an average particle diameter of 0.1 µm to less than 1 µm.

5. The thermally conductive polysiloxane composition according to claim 4, wherein the inorganic particles of the component (A-2) are aluminum nitride particles or alumina particles.

6. The thermally conductive polysiloxane composition according to claim 2, further comprising (C) a polyorganosiloxane containing at least one aliphatic unsaturated group per molecule.

7. The thermally conductive polysiloxane composition according to claim 2, further comprising:
    (D) a polyorganohydrogensiloxane having at least two hydrogen atoms bonded to silicon atoms per molecule; and
    (E) a platinum-based catalyst.

8. The thermally conductive polysiloxane composition according to claim 2, wherein the component (B) comprises the alkoxysilyl group-containing compound, wherein the composition further comprises (F) a condensation catalyst.

9. A heat dissipation material comprising the thermally conductive polysiloxane composition according to claim 2.

10. The thermally conductive polysiloxane composition according to claim 1, wherein the aluminum nitride particles of the component (A-1) are single crystal particles.

11. The thermally conductive polysiloxane composition according to claim 10, wherein the component (A) comprises:

20% to 70% by mass of the component (A-1);
1% to 50% by mass of (A-2) inorganic particles having an average particle diameter of 1 µm to less than 30 µm; and
1% to 50% by mass of (A-3) inorganic particles having an average particle diameter of 0.1 µm to less than 1 µm.

12. The thermally conductive polysiloxane composition according to claim 11, wherein the inorganic particles of the component (A-2) are aluminum nitride particles or alumina particles.

13. The thermally conductive polysiloxane composition according to claim 10, further comprising (C) a polyorganosiloxane containing at least one aliphatic unsaturated group per molecule.

14. The thermally conductive polysiloxane composition according to claim 10, further comprising:

(D) a polyorganohydrogensiloxane having at least two hydrogen atoms bonded to silicon atoms per molecule; and (E) a platinum-based catalyst.

15. The thermally conductive polysiloxane composition according to claim 1, wherein the component (A) comprises:
   20% to 70% by mass of the component (A-1);
   1% to 50% by mass of (A-2) inorganic particles having an average particle diameter of 1 μm to less than 30 μm; and
   1% to 50% by mass of (A-3) inorganic particles having an average particle diameter of 0.1 μm to less than 1 μm.

16. The thermally conductive polysiloxane composition according to claim 15, wherein the inorganic particles of the component (A-2) are aluminum nitride particles or alumina particles.

17. The thermally conductive polysiloxane composition according to claim 1, further comprising (C) a polyorganosiloxane containing at least one aliphatic unsaturated group per molecule.

18. The thermally conductive polysiloxane composition according to claim 1, further comprising:
   (D) a polyorganohydrogensiloxane having at least two hydrogen atoms bonded to silicon atoms per molecule; and
   (E) a platinum-based catalyst.

19. The thermally conductive polysiloxane composition according to claim 1, wherein the component (B) comprises the alkoxysilyl group-containing compound, wherein the composition further comprises (F) a condensation catalyst.

20. A heat dissipation material comprising the thermally conductive polysiloxane composition according to claim 1.

* * * * *